United States Patent
Seo (10) Patent No.: US 6,915,073 B2
(45) Date of Patent: Jul. 5, 2005

(54) STEREO CAMERA AND AUTOMATIC CONVERGENCE ADJUSTING DEVICE

(75) Inventor: Shuzo Seo, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/268,806

(22) Filed: Oct. 11, 2002

(65) Prior Publication Data

US 2003/0072570 A1 Apr. 17, 2003

(30) Foreign Application Priority Data

Oct. 12, 2001 (JP) .................................... P2001-314931

(51) Int. Cl.[7] .......................... G03B 35/00; G03B 41/00
(52) U.S. Cl. ..................................... 396/331; 396/333
(58) Field of Search .............................. 396/331, 324, 396/333, 199, 544, 351, 329, 79, 88; 348/42, 47, 49; 352/57, 60; 359/462, 466, 470, 475; 353/7

(56) References Cited

U.S. PATENT DOCUMENTS

| | | | | |
|---|---|---|---|---|
| 4,839,824 A | * | 6/1989 | Ando | .......................... 702/166 |
| 4,842,411 A | * | 6/1989 | Wood | .......................... 356/603 |
| 4,995,716 A | * | 2/1991 | Warnicki et al. | ............ 351/212 |
| 5,581,314 A | | 12/1996 | Yoneyama et al. | ......... 396/331 |
| 5,828,913 A | * | 10/1998 | Zanen | ......................... 396/324 |
| 6,567,682 B1 | * | 5/2003 | Osterweil et al. | ........... 600/407 |
| 2001/0019450 A1 | * | 9/2001 | Ogino | ......................... 359/462 |
| 2002/0006282 A1 | * | 1/2002 | Ushiro et al. | ............... 396/429 |
| 2002/0081019 A1 | * | 6/2002 | Katayama et al. | .......... 382/154 |

FOREIGN PATENT DOCUMENTS

| | | |
|---|---|---|
| JP | 0-152282 | 5/2000 |
| JP | 2-152779 | 5/2002 |

* cited by examiner

Primary Examiner—Alan A. Mathews
Assistant Examiner—Rochelle Blackman
(74) Attorney, Agent, or Firm—Greenblum & Bernstein, P.L.C.

(57) ABSTRACT

A stereo camera with an automatic convergence adjusting device is provided. A stereo-image is captured by a CCD through a stereo adapter. A fiducial light beam in a plane of symmetry which includes a perpendicular bisector line of a segment between the viewpoints of the right and left parallax images, is projected onto a subject from light-emitting equipment. A fiducial spot produced by the fiducial light beam is imaged on both the right and left parallax images and the image loci of the fiducial spot are detected. The convergence of the stereo adapter is adjusted with reference to the image loci of the fiducial mark.

16 Claims, 11 Drawing Sheets

STEREO CAMERA AND AUTOMATIC CONVERGENCE ADJUSTING DEVICE

BACKGROUND OF THE INVENTION

1. Field of the Invention

The present invention relates to a stereo camera that captures images for stereo vision.

2. Description of the Related Art

Stereo vision utilizing a pair of perspective images of a subject is well known. A stereo camera takes a pair of perspective images (commonly referred to as parallax images) from different viewpoints, which correspond to the right and left eye, thereby binocular vision is emulated because of the parallax between the two images. For a stereo camera, a twin lens system or a single lens system is known. A stereo camera with a twin lens system obtains each parallax image individually through two independent photographing systems. A camera with a single lens system bifurcates the light path of the photographing lens system by using a mirror or a prism, so that the right and left parallax images are obtained by the single imaging device mounted in the camera.

In the stereo-image capturing operation, convergence between a pair of parallax images should be adjusted for natural stereo vision. The convergence of a stereo camera system is often manually adjusted. However, in Japanese unexamined patent publication (KOKAI) No. 2000-152282, a stereo camera with an automatic convergence adjusting mechanism is disclosed. In the above-disclosed stereo camera, the light path of the single lens system is bifurcated by a prism. Each branched light path is reflected toward a subject by a mirror which is rotatable about a predetermined axis and the right and left parallax images are taken in turn. The distance between the apparatus and a subject is detected by triangular surveying with a distance measurement device. The tilt of the mirrors is controlled in accordance with the distance of the subject obtained by the distance measurement device, so that the convergence is automatically adjusted.

However, the above-disclosed automatic convergence adjusting mechanism requires a distinct distance measurement device, so that it brings about a complicated construction and high cost. The above mechanism also requires space and complicated software to control the mirrors for adjusting the convergence.

SUMMARY OF THE INVENTION

Therefore, an object of the present invention is to provide a stereo camera and an automatic convergence adjusting device that adjusts the convergence of the stereo camera swiftly and automatically, and that has a simple structure. Particularly, the object of the present invention is oriented to a stereo camera which captures a pair of stereo images by utilizing a single photographing optical system.

According to the present invention, a stereo camera is provided that comprises an imaging device, a fiducial light beam projector, a fiducial mark detecting processor, and a convergence adjusting processor.

The imaging device is for capturing a stereo-image which comprises a pair of right and left parallax images. The fiducial light beam projector projects a light beam to a subject to produce a fiducial mark on the subject. The fiducial mark detecting processor detects image loci of the fiducial mark in each of the right and left parallax images. The convergence adjusting processor adjusts the convergence of the stereo-image in accordance with the image loci of the fiducial mark. Further the fiducial light beam is emitted in a plane of symmetry which includes a perpendicular bisector line of a segment between the viewpoints of the right and left parallax images.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiments shown in the drawings.

Figure 1:
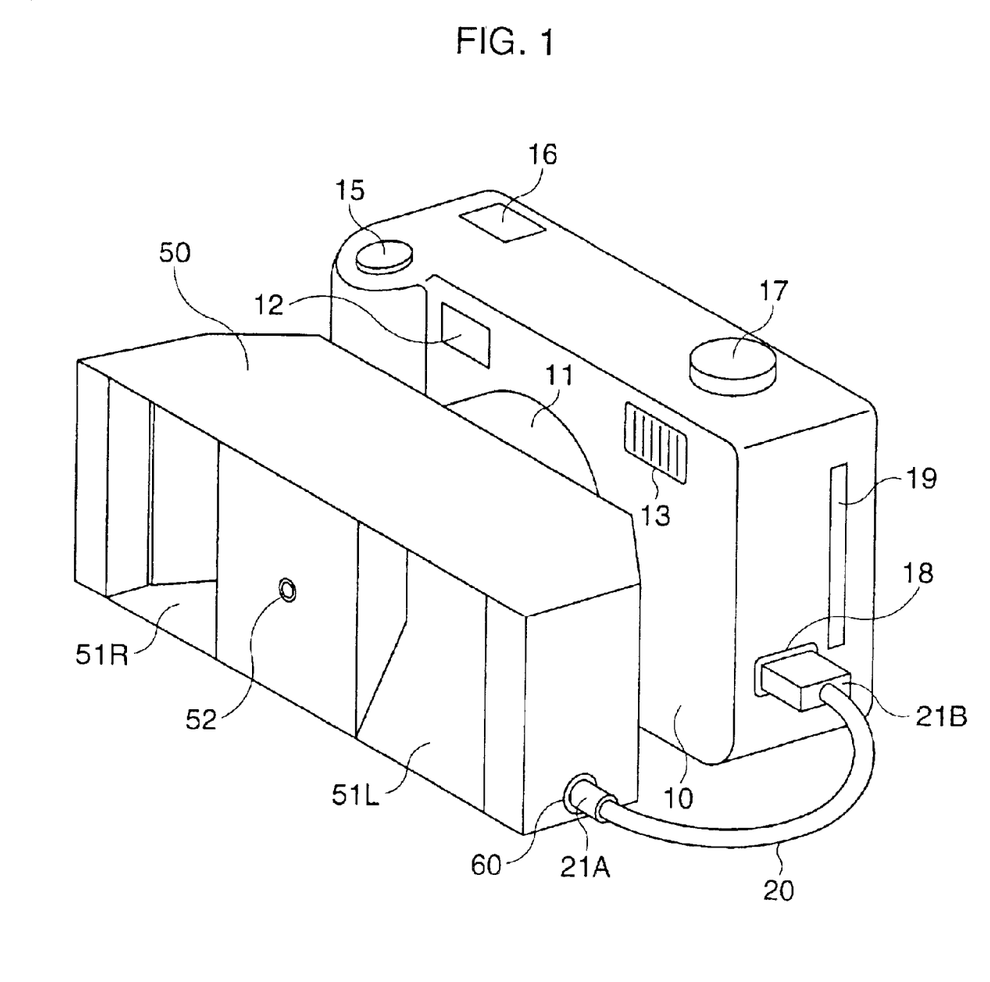
FIG. 1 is a perspective view of a stereo camera for the first embodiment of the present invention.

FIG. 1 is a perspective view of a stereo camera of the first embodiment of the present invention. With reference to FIG. 1, the first embodiment will be explained.

On a front surface of a camera body 10, a (objective) viewfinder 12 is provided at the upper left corner from the photographing lens barrel 11 and an electronic flash 13 is provided at the upper right corner from the lens barrel 11. On the left side of the upper surface of the camera body 10, a release switch 15 and a liquid crystal display panel 16 are provided, while a mode dial 17 is provided on the right side. An interface connector 18 and a card slot 19 into which a storage medium (not shown) such as an IC memory card may be inserted, are formed on a side surface of the camera body 10.

In front of the lens barrel 11, a stereo adapter 50 is detachably attached through a mount (not shown). Respective openings 51L and 51R are formed in each of the left and right sides of the stereo adapter 50. As will be described later, the light path of the lens barrel 11 is bifurcated by mirrors in the stereo adapter 50 (see FIG. 2) and light is guided from the respective openings through the optical system. Namely, a left-image and a right-image of a stereo-image are captured through the opening 51L and 51R, respectively. Between the openings 51L and 51R, light-emitting equipment 52 with a light source (a laser, LED, and so on) is provided. From the light-emitting equipment 52, a narrow light beam is emitted to a subject. The beam coincides with the optical axis of the photographing optical system 11A (or photographing lens system) mounted inside the lens barrel 11 (see FIGS. 2 and 3). As will be discussed latter, the light beam is used for adjusting the convergence by projecting a fiducial spot or mark onto a subject. Further, on a side of the stereo adapter 50, an interface connector 60 is provided to which one of a connector 21A of an interface cable 20 is detachably connected. The other side of connector 21B of the interface cable 20 is detachably connected to the interface connector 18 of the camera body 10.

Figure 2:
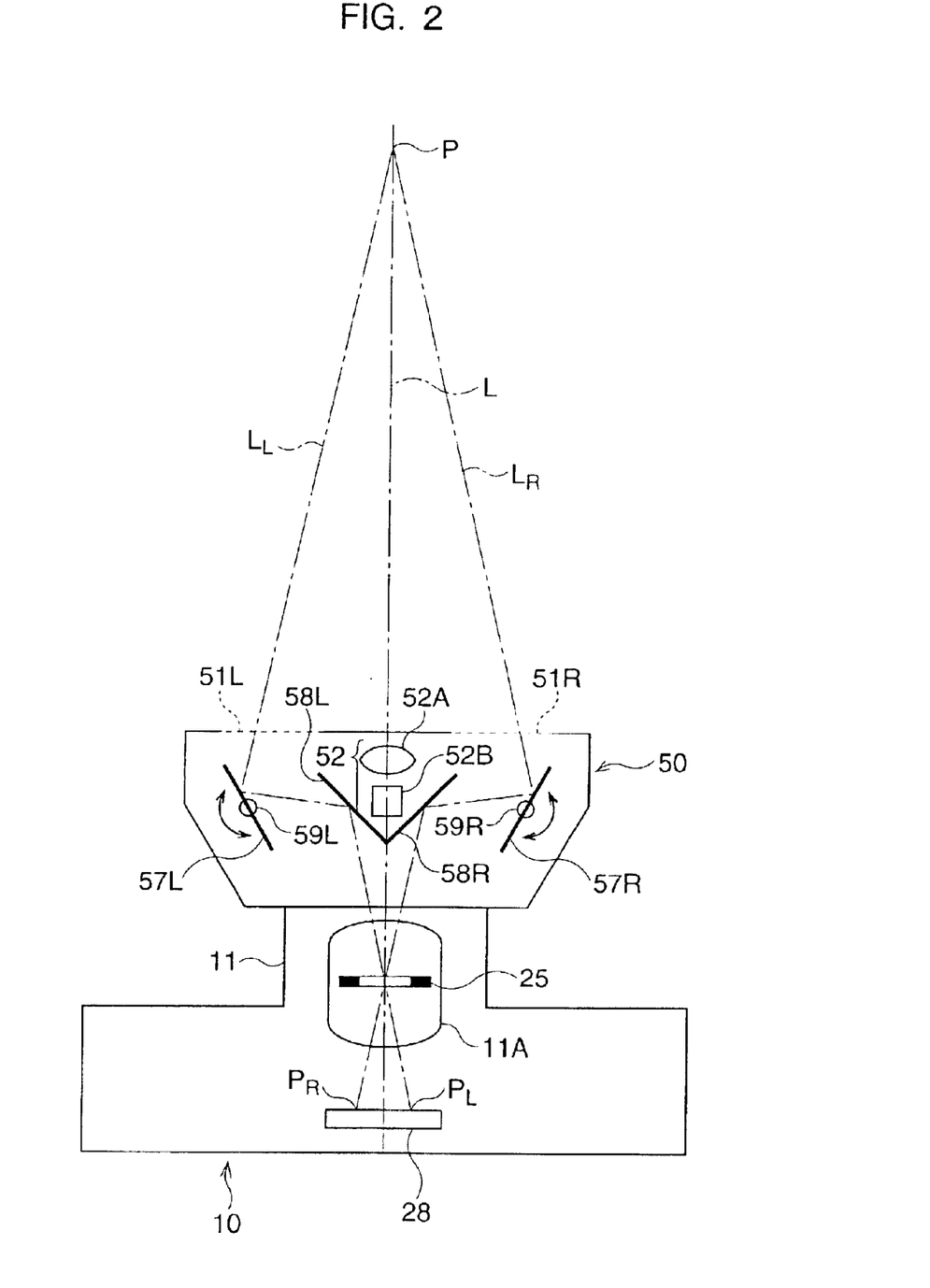
FIG. 2 illustrates the optical construction of the stereo camera of the first embodiment shown in FIG. 1.

FIG. 2 schematically illustrates the optical structure of the stereo camera in FIG. 1. For example, the light-emitting equipment 52 mounted inside the stereo adapter 50 comprises an optical system 52A (for example lens system) and a light-emitting device 52B (LED, laser diode, and so on) for a light source. The light-emitting equipment 52 emits a light beam for a fiducial spot. The optical axis of the optical system 52A is arranged coaxially with the optical axis L of the photographing lens system 11A. Therefore, a light beam from the light-emitting equipment 52 is projected onto a point P where the optical axis L intersects with a subject.

In the stereo adapter 50, rotatable mirrors 57L and 57R are arranged symmetrically with respect to the optical axis L. The respective rotatable mirrors 57L and 57R are rotatable about axes 59L and 59R, which are arranged perpendicular to the optical axis L, and each rotating angle of the mirrors are symmetrical with respect to the optical axis L. The stereo adapter 50 also has fixed mirrors 58L and 58R. Each fixed mirror 58L and 58R is oppositely disposed against the respective rotatable mirrors 57L and 57R, and is symmetrically arranged with respect to the optical axis L, at an angle of 135 degrees from the axis. Namely, a side of the fixed mirror 58L comes into contact with a side of the fixed mirror 58R at a right angle whereby the optical axis L passes through the contact sides. Further, the reflecting surface of each rotatable mirror 57L and 57R faces the respective reflecting surface of the fixed mirrors 58L and 58R. Therefore, light made incident to the left opening 51L is at first reflected by the rotatable mirror 57L and then reflected by the fixed mirror 58L toward the photographing optical system 11A, thereby the incident light is lead to the right-half area (in FIG. 2) of a CCD (imaging device) 28 of the stereo camera 10 through the photographing optical system 11A. Similarly, light made incident to the right opening 51R is at first reflected by the rotatable mirror 57R and then reflected by the fixed mirror 58R toward the photographing optical system 11A, thereby the incident light is lead to the left-half area (in FIG. 2) of the CCD 28 through the photographing optical system 11A. Namely, a left image is taken in the right-half area of the CCD 28 and a right image is taken in the left-half area of the CCD 28. Note that, the photographing optical system 11A includes an aperture 25, such as an iris stop.

Consequently, from the above construction of the stereo adapter, a ray or a radial line from the left viewpoint that penetrates the center of a left image (which will be referred to as the left view axis) and a ray or a radial line from the right viewpoint that penetrates the center of a right image (which will be referred to as the right view axis) always intersect on a bisector line perpendicular to the segment between the right and left viewpoints. Further, in the present embodiment, since the optical axis L is in a plane that perpendicularly bisects the segment between the right and left viewpoints and is in the same plane as the right and left view axes, a fiducial light beam from the light-emitting equipment 52 is always projected onto an intersection of the right and left view axes. Therefore, when the convergence is out of place, the images of a spot produced by a fiducial light beam in each of the right and left images deviate from the center of each of the right and left images. With respect to a vertical plane including the optical axis L, the deviations of each spot image in the right and left images has a mirror image relation.

In the present embodiment, the convergence of the stereo-image is adjusted by changing the angles of the rotatable mirrors 57L and 57R. For example, in FIG. 2, the point P coincides with the intersection of the optical axis L and a subject. Namely, the angle of convergence is adjusted by coordinating the angle of each rotatable mirror 57L and 57R so that the intersection (point P) of the view axes coincides with the intersection of the optical axis L and the subject. Light rays from the point P which are made incident to the left opening 51L are reflected by the rotatable mirror 57L and fixed mirror 58L, and then an image of the point P is produced at a point $P_L$ in the right-half area of the CCD 28 via the photographing optical system 11A. In the convergence adjusting operation of the present embodiment, the position of the point $P_L$ is moved toward the center of the right-half area of the CCD 28 by changing an angle of the rotatable mirror 57L, so that the point $P_L$ substantially coincides with the center of the right-half area of the CCD 28. Similarly, light beams from the point P which are made incident to the right opening 51R are reflected by the rotatable mirror 57R and fixed mirror 58R, and then an image of the point P is produced at a point $P_R$ in the left-half area of the CCD 28 via the photographing optical system 11A. Further, the position of the point $P_R$ is moved toward the center of the right-half area of the CCD 28 by changing an angle of the rotatable mirror 57R, so that the point $P_R$ substantially coincides with the center of the left-half area of the CCD 28. Consequently, the convergence of a stereo-image (right and left images) is adjusted to the position of a subject.

Figure 3:
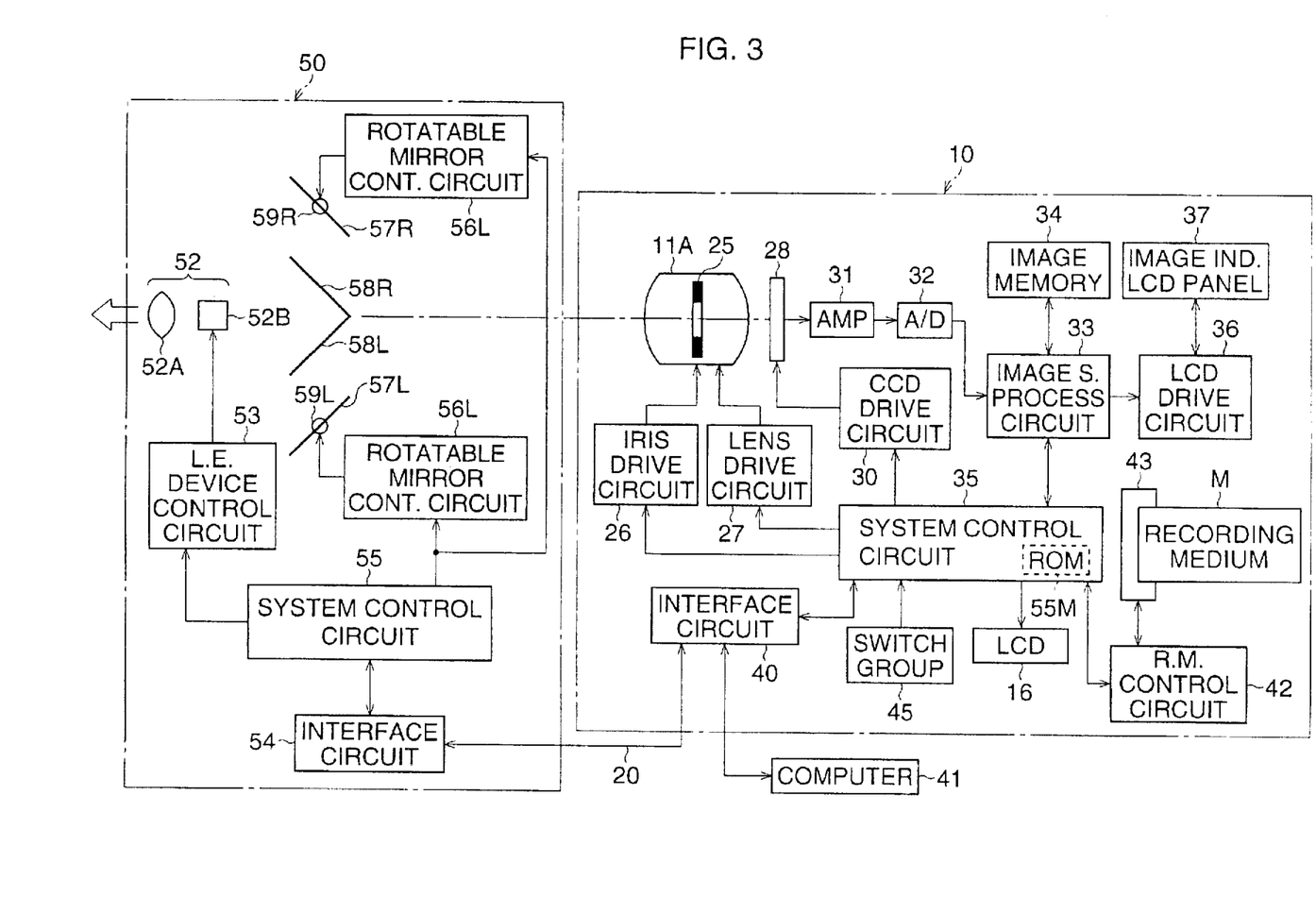
FIG. 3 is a block diagram showing the electrical construction of the stereo camera of the first embodiment.

FIG. 3 is a block diagram showing an electrical construction of the stereo camera in FIGS. 1 and 2.

The light-emitting device 52B is controlled by the light emitting device control circuit 53. Further, the light emitting device control circuit 53 is driven and controlled by a system control circuit 55. Driving mechanisms (not shown) for the rotatable mirrors 57L and 57R are attached at each of the rotating axes 59L and 59R of the mirrors 57L and 57R. The driving mechanisms may comprise a stepping motor. Rotation of the rotatable mirrors 57L and 57R is controlled by each of rotatable mirror control circuits 56L and 56R. The rotatable mirror control circuits 56L and 56R are controlled by the system control circuit 55. The system control circuit 55 is connected to an interface circuit 54. As shown in FIG. 1, the interface circuit 54 is connected to the interface circuit 40 of the camera body 10 via the interface cable 20. Note that, the interface circuit 54 is connected to the connector 60 (not shown in FIG. 3 but in FIG. 1) and connector 21A of the interface cable 20 is detachably fitted into the connector 60.

The light made incident to the stereo adapter 50 is led to the CCD 28 through the photographing optical system 11A of the camera body 10. The opening degree of the aperture 25 provided in the photographing optical system 11A is adjusted by an iris drive circuit 26. A focusing operation and a zoom operation of the photographing optical system 11A are controlled by a lens drive circuit 27.

A subject image is formed on a light receiving surface of the CCD 28 through the photographing optical system 11A, and an electric charge corresponding to the subject image is generated therein. An operation, such as an accumulating operation and a reading operation of the electric charge of the CCD 28, is controlled by a CCD drive circuit 30. An electric charge signal, i.e., an image signal, read from the CCD 28 is amplified by an amplifier 31, and is converted from an analog signal to a digital signal by an A/D converter 32. The digital image signal is subjected to a process, such as a gamma correction, in the image signal process circuit 33, and is stored as digital image data in an image memory 34. The iris drive circuit 26, the lens drive circuit 27, the CCD drive circuit 30, and the image signal process circuit 33 are controlled by a system control circuit 35.

The digital image data are read from the image memory 34, and supplied to an LCD drive circuit 36. The LCD drive circuit 36 is operated in accordance with the digital image data, so that an image corresponding to the digital image data is indicated on an image indication LCD panel 37.

An interface circuit 40 is connected to the system control circuit 35 and the connector 18 (see FIG. 1) is detachably connected to the interface circuit 40. Namely, when the stereo adapter 50 is mounted on the lens barrel 11 for stereoscopic image capturing, the interface circuits 40 and 54 are interconnected by the interface cable 20. Thereby, the system control circuit 35 in the camera body 10 and the system control circuit 55 in the stereo adapter 50 are electrically connected, so that data communication can be mutually carried out. Further, the connector 18 may be connected to a computer 41, whereby the digital image data stored in the image memory 34 can be transmitted to the computer 41.

In the stereo-image capturing operation, the system control circuit 55 controls the angles of the rotatable mirrors 57L and 57R via the rotatable mirror control circuits 56L and 56R in accordance with data or control signals from the system control circuit 35 (described later).

Further, the system control circuit 35 is connected to an image recording device 43 through a recording medium control circuit 42. Therefore, the digital image data read from the image memory 34 can be recorded in a recording medium M, such as an IC memory card, attached to the image recording device 43.

The liquid crystal display panel 16 and a switch group 45, including the release switch 15 and the mode dial 17, are connected to the system control circuit 35.

With reference to FIGS. 2 to 5, the principle of the convergence adjusting operation of the present embodiment will be explained.

Figure 4:
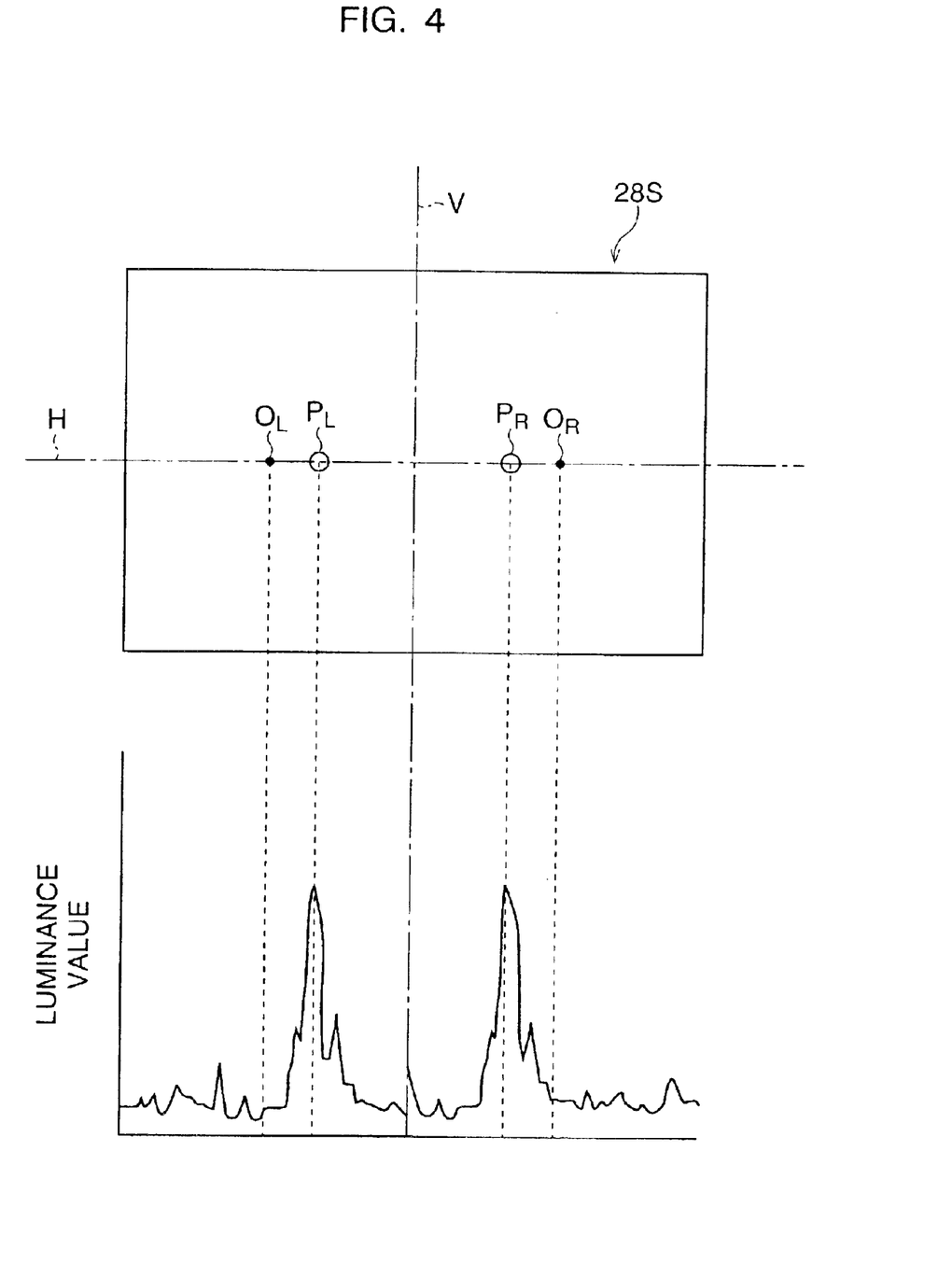
FIG. 4 illustrates image loci of a fiducial light beam on the imaging surface before the convergence adjusting operation of the first embodiment and its luminance distribution along the horizontal line H at that time.

In FIG. 4, the imaging surface 28S of the CCD 28 and an example of luminance signals or values along the horizontal line H across the center of the imaging surface 28S are illustrated. The imaging surface 28S is bisected by the vertical line V across the center of the imaging surface 28S. In FIG. 4, a left parallax image is captured in the left-half area (which corresponds to the right-half area of FIG. 2) of the imaging surface 28S. Similarly, a right parallax image is captured in the right-half area (which corresponds to the left-half area of FIG. 2) of the imaging surface 28S. The points $O_L$ and $O_R$ indicate the center of the left-half area and the right-half area, respectively.

As explained, with reference to FIG. 2, a fiducial light beam from the light-emitting equipment 52 is reflected at the point P, where the optical axis L and a subject intersect, and the reflected light rays form the fiducial spot images in the left-half area and right-half area of the imaging surface 28S of the CCD 28. Before the convergence adjusting operation, the convergence angle of the stereo adapter 50 is not adjusted, so that the view axes of the left and right images does not intersect at the proper point P, where a fiducial light beam intersects with the subject. Namely, the angle of each rotatable mirror 57L and 57R or convergence angle has been set to a position either beyond or before the proper point P. Therefore, neither of the image loci $P_L$ nor $P_R$ in the left-half and right-half area (which indicate positions of the images corresponding to the fiducial spot produced at the object point P) coincides with the center $O_L$ of the left-half area and the center $O_R$ of the right-half area. For example, in FIG. 4, the convergence angle is set to a position beyond a subject, therefore the image loci $P_L$ and $P_R$ of the object point P are produced in an area between the center $O_L$ and the center $O_R$. Note that, since the point P is on the optical axis L (which corresponds to a bisector line of the segment between the right and left viewpoints) and the angles of the rotatable mirrors 57L and 57R are controlled symmetrically with respect to the optical axis L, the view axes of right and left parallax images intersect with the optical axis all the time. Therefore, each of the image loci $P_L$ and $P_R$ is produced as a mirror image of one another with respect to a vertical plane that includes the optical axis L. As a result, the image loci $P_L$ and $P_R$ are both positioned on the horizontal line H and the lengths of the segments $O_L P_L$ and $O_R P_R$ are the same. Further, when the convergence angle is set to be between the camera and a subject, the image loci $P_L$ and $P_R$ of the object point P are produced outside the area between the center $O_L$ and the center $O_R$.

Figure 5:
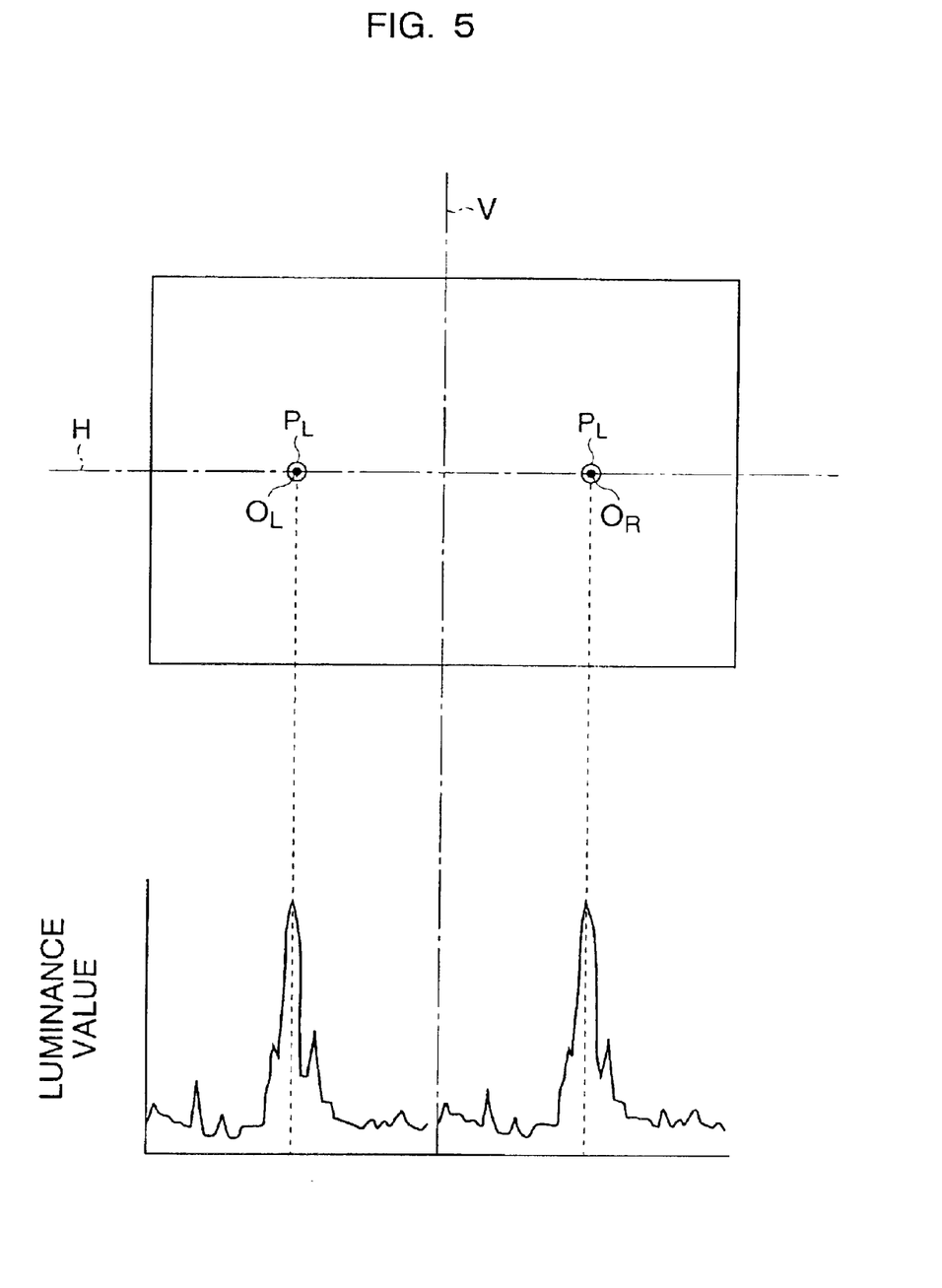
FIG. 5 illustrates image loci of a fiducial light beam on the imaging surface after the convergence adjusting operation of the first embodiment and the luminance distribution along the horizontal line H at that time.

Since the fiducial spot is projected onto the object point P, values of the luminance signals obtained at the image loci $P_L$ and $P_R$ are extreme in relation to those in other positions. The luminance signals are prominent at the image loci $P_L$ and $P_R$ and indicates peak values as shown in FIG. 4. As described above, the image loci $P_L$ and $P_R$ do not coincide with the center $O_L$ and $O_R$, before the convergence adjusting operation is carried out. In the present embodiment, the deviation or the distance between the image locus ($P_L$ or $P_R$) and the center ($O_L$ or $O_R$) is detected and the angle of each rotatable mirror 57L and 57R is controlled in accordance with the deviation (or distance) value and the current angle values of the rotatable mirror 57L and 57R (or convergence angle), so that the intersection of the view axes is successively converged to the object point P and the convergence of the stereo-image is adjusted. Thereby, the image loci $P_L$ and $P_R$ coincide with the centers $O_L$ and $O_R$, as shown in FIG. 5. The convergence adjusting operation is carried out in accordance with discrepancy of the image loci ($P_L$ and $P_R$) with the centers ($O_L$ and $O_R$) and the current convergence angle, with reference to a lookup table stored in a ROM 55M mounted inside the system control circuit 55 (see FIG. 3). Namely, in the ROM 55M, compensation values for rotating the mirrors (57L and 57R) about the axes (59L and 59R) are stored. These values taken into consideration the current mirror angles and deviations of the image loci $P_L$ and $P_R$ from the center $O_L$ and $O_R$, so that the convergence is adjusted. Note that, in place of a lookup table, a function which can derive the above compensation values from the current mirror angles and deviations or discrepancy of the image loci $P_L$ and $P_R$ with the center $O_L$ and $O_R$, may be stored in the ROM 55M. Further this function can be achieved by an electric circuit.

Figure 6:
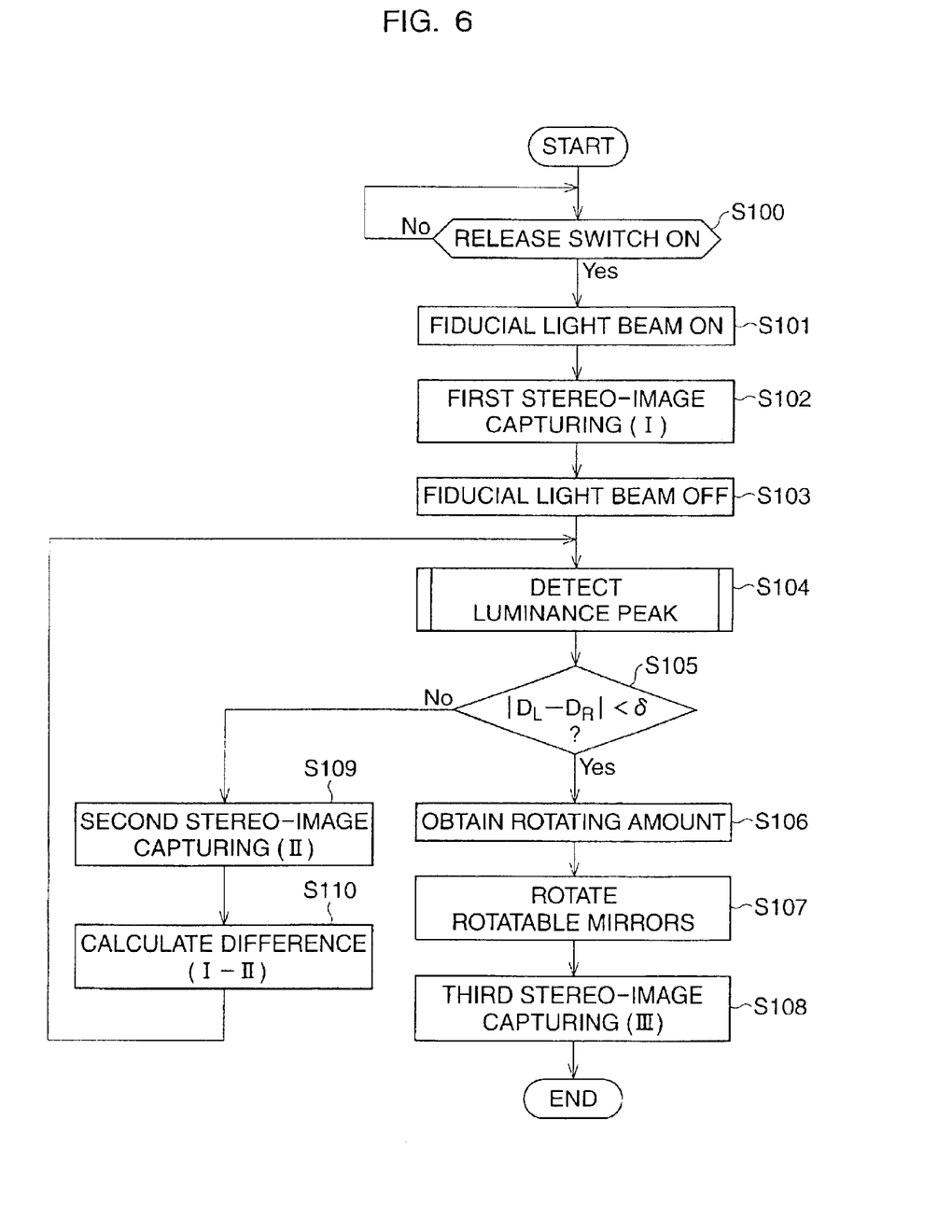
FIG. 6 is a flow chart showing the convergence adjusting operation of the first embodiment.

FIG. 6 shows a flowchart of the stereo-image capturing operations in the present embodiment, which include an automatic convergence adjusting operation. With reference to FIG. 6, the automatic convergence adjusting operation of the present embodiment will be explained.

When it is determined in Step S100 that the release switch 15 is fully depressed, Step S101 is executed so that the light-emitting device 52B is turned on and a fiducial light beam is projected onto a subject from the light-emitting equipment 52. In Step S102, right and left parallax images are simultaneously captured under the condition where the fiducial light beam is projected onto the subject (first stereo-image capturing operation (I)). The image data of the right and left parallax images are temporarily stored in the image memory 34. When the first stereo-image capturing operation (I) is completed, the light-emitting device 52B is turned off in Step S103.

In Step S104, the luminance of the image data for the right and left parallax images, which are stored in the image memory 34, are examined, as shown along the horizontal line H of FIG. 4. Thereby, the peak luminance values along the horizontal line H for the right and left parallax images are detected. The position of the luminance peak in the left image is represented by a relative coordinate value $D_L$ from the center $O_L$. Similarly, the position of the luminance peak in the right image is calculated and represented by a relative coordinate value $D_R$ from the center $O_R$. For example, the coordinate values $D_L$ and $D_R$ are determined as positive when the peaks exist between the centers $O_L$ and the center $O_R$, and negative when the peaks are outside the segment $O_L O_R$.

Step S105, the relative coordinates values $D_L$ and $D_R$ are compared. For example, a subtraction is carried out between the relative coordinates values $D_L$ and $D_R$, and the absolute value of the result is compared with a predetermined value $\delta$ (>0) to determine whether the value is smaller than $\delta$. The value $\delta$ is set as a small value that is sufficient to regard the relative coordinate values $D_L$ and $D_R$ as being substantially the same when the absolute value of a difference between the relative coordinate values $D_L$ and $D_R$ is smaller than the value $\delta$. When $|D_L - D_R| < \delta$, the positions of luminance peaks on the horizontal line H of the right and left parallax images, which are detected in Step S104, are symmetrical to each other with respect to the vertical line V, in the present embodiment. Thereby, the peaks can be regarded as indicating the images loci $P_L$ and $P_R$ of the point P in the right and left parallax images. Therefore, when it is determined $|D_L - D_R| < \delta$ in Step S105, the process proceeds to Step S106, in which the rotating amounts of the rotatable mirrors 57L and 57R, are obtained with reference to the lookup table which is based on the values of the detected coordinates $D_L$ and $D_R$, and the current angles of the rotatable mirror 57L and 57R.

The processes from Step S104 to Step S106 are carried out in the system control circuit 35 of the camera body 10. In Step S106, the rotating amounts of the rotating mirrors 57L and 57R are transferred to the system control circuit 55 of the stereo adapter 50 via the interface cable 20. Note that, the processes from Step S104 through Step S107 and in Step S110 may be carried out by the system control circuit 55 of the stereo adapter side, while the camera side only executes a stereo-image capturing operation and an image-data transferring operation that transmits the captured image-data to the stereo adapter 50.

In Step S107, the convergence is adjusted to the point P by rotating the rotatable mirrors 57L and 57R in accordance with control signals from the system control circuit 55, which are based on the rotating amounts sent from the system control circuit 35. In Step S108, right and left parallax images are simultaneously captured (third stereo-image capturing operation (III)) without a fiducial light beam, and then the process ends after storing the image-data in the image memory 34. Note that, the right and left parallax images stored in the image memory 34 may be recorded in a recording medium M, such as an IC card, later on.

On the other hand, when it is determined in Step S105 that $|D_L - D_R| < \delta$ is not true, at least one of the detected luminance peak positions cannot be considered as an image locus $P_L$ or $P_R$ of the point P, and the process proceeds to Step S109. This situation occurs when either a subject or the surroundings has an area with a high luminance value so that a point corresponding to this area is detected as a luminance peak.

In Step S109, right and left parallax images are again captured without emitting a fiducial light beam (second stereo-image capturing operation (II)). In Step S110, the difference between the luminance values of the right and left parallax images obtained by the first stereo-image capturing operation (I) in Step S102 and those obtained by the second stereo-image capturing operation (II) in Step S109 is calculated. Then, the process returns to Step S104 and the positions of the luminance peaks in the right and left parallax images are detected with reference to the difference in the luminance values calculated in Step S110. Namely, in Step S110, only luminance information due to a fiducial light beam is extracted by subtracting the luminance values of the right and left parallax images obtained in the second stereo-image capturing operation (II) from those obtained in the first stereo-image capturing operation (I).

As described above, according to the first embodiment of the present invention, right and left parallax images can be simultaneously captured through a single photographing optical system. Also the convergence can be swiftly and automatically adjusted with by utilizing a simple design and simple operations. Further, the stereo camera in the present embodiment uses a stereo adapter, so that the present system can be achieved by making simple modifications to software of a conventional digital camera and mounting the stereo adapter on a standard camera. Therefore, an automatic convergence controlled stereo camera can be obtained at a low cost.

Next, the second embodiment of the present invention will be explained with reference to FIG. 7 through FIG. 11. Note that, the stereo camera in the second embodiment is similar to the stereo camera in the first embodiment, so that members or elements which have the same construction as those in the first embodiment-will be referred to using the same references, and the details these of are omitted.

Figure 7:
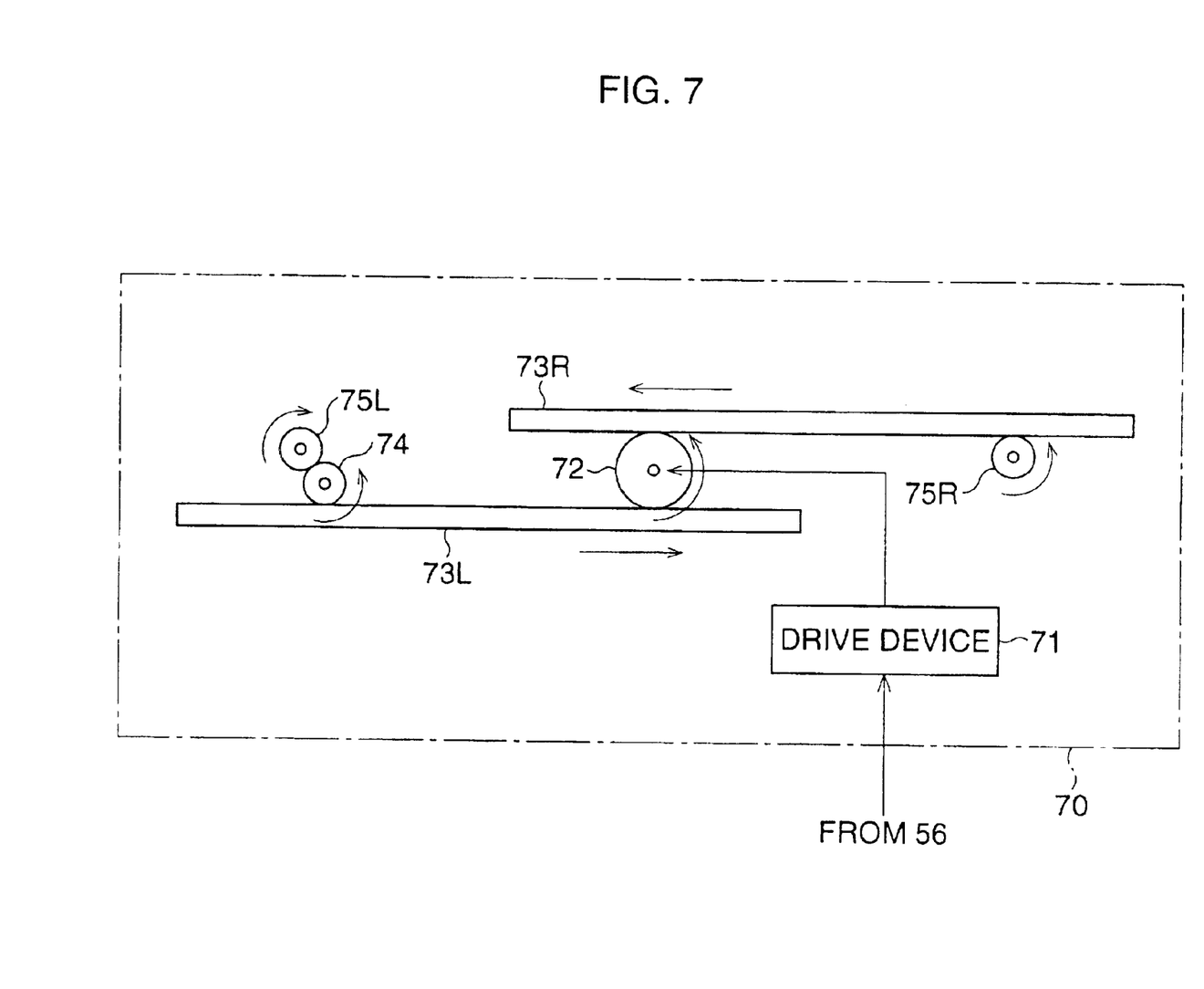
FIG. 7 schematically illustrates the construction of a rotatable mirror drive mechanism used in the second embodiment.
Figure 8:
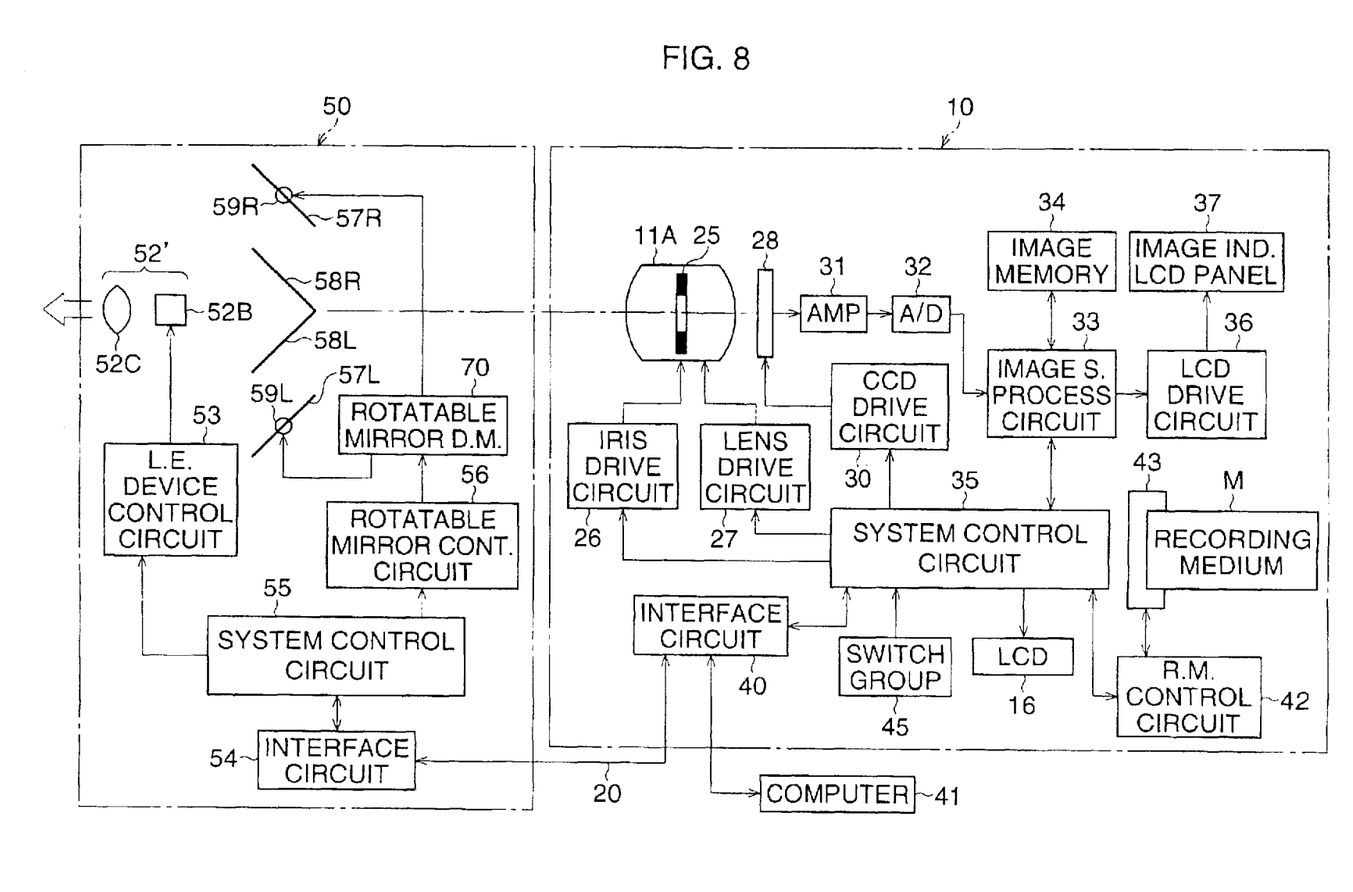
FIG. 8 is a block diagram showing the electrical construction of the stereo camera of the second embodiment.

FIG. 7 schematically illustrates a construction of a rotatable mirror driving mechanism 70 of the second embodiment. FIG. 8 is a block diagram showing an electrical construction of the stereo camera of the second embodiment.

In the first embodiment, the rotatable mirrors 57L and 57R are turned by the driving mechanisms (ex. stepping motor) attached to the these. However, in the second embodiment, both rotatable mirrors 57L and 57R are turned by a rotatable mirror driving mechanism 70, of which FIG. 7 is an example.

In FIG. 7, a driving device 71, such as a stepping motor, is controlled by control signals from a rotatable mirror control circuit 56 (see FIG. 8). The drive shaft of a gear wheel 72 is connected to the driving device 71 and the shaft is rotated in accordance with control signals from the rotatable mirror control circuit 56. The gear wheel 72 engages with each of the racks 73L and 73R on opposite sides with reference to the drive shaft. Namely, teeth on the right side of the rack 73L and the left side of the rack 73R respectively engage with the gear wheel 72 and the racks 73L and 73R are arranged substantially parallel to one another with the gear wheel 72 between them. The teeth on the left side of the rack 73L engage with a pinion 74 and the teeth on the rack 73R engage with a pinion 75R. Further the pinion 74 engages with the pinion 75L. The axes of each pinion 75L and 75R are arranged symmetrical with respect to the axis of the gear wheel 72 and connected to the axes of each rotatable mirror 57L and 57R. Further radii and pitches of each pinion 74, 75L, and 75R are the same. Therefore, the angles of the rotatable mirrors 57L and 57R are controlled symmetrical with respect to the optical line L by the single driving device 71. For example, when the gear wheel 72 is rotated in the counter clockwise direction, as shown in FIG. 7, the rack 73L is horizontally translated in the right direction and the rack 73R is horizontally translated in the left direction. At this time, the pinions 74 and 75R are rotated in the counter clockwise direction and the pinion 75L is rotated in the clockwise direction by the same amount of angle as the pinion 75R.

In the first embodiment, light from the light emitting device 52B is collimated through the optical system 52A (such as lens system) and emitted as a narrow fiducial light beam that coincides with the optical axis L. However, in the second embodiment, an optical system 52C, which corresponds to the optical system 52A, comprises a diffraction grating. A light beam is diverged by the light-emitting equipment 52', in a perpendicular plane that includes the optical axis L, which is different to the first embodiment. The flatly diverged light beam is used as a fiducial light beam. Namely, the mirrors (57L, 58L) and the mirrors (57R, 58R) have plane symmetry with respect to the plane which includes the fiducial light beam. Therefore, a fiducial light beam in the second embodiment is projected onto a line with which the plane of symmetry and a subject intersects.

According to the above construction, the fiducial light beam is diverged in a perpendicular bisector plane of the segment between the right and left viewpoints. Thereby, images of a fiducial light beam in the right and left parallax images are mirror images with respect to the centers $O_L$ and $O_R$. Namely, since a curved line produced on a subject by a fiducial light beam coincides with the intersection line of a subject and the above plane of symmetry, the images of the curved line on the left and right half areas of the imaging surface 28S are symmetrically formed with respect to the vertical line V, as indicated in FIG. 9 as the curved lines $C_L$ and $C_R$.

In the first embodiment, luminance peaks are searched for on the horizontal line H only. However, in the second embodiment, luminance peaks are also searched for on horizontal lines other than the horizontal line H. For example, luminance peaks are also searched for on horizontal lines H1 and H2 that are arranged above and below the horizontal line H0 (which corresponds to the horizontal line H in FIGS. 4 and 5) at appropriate predetermined distances.

Figure 9:
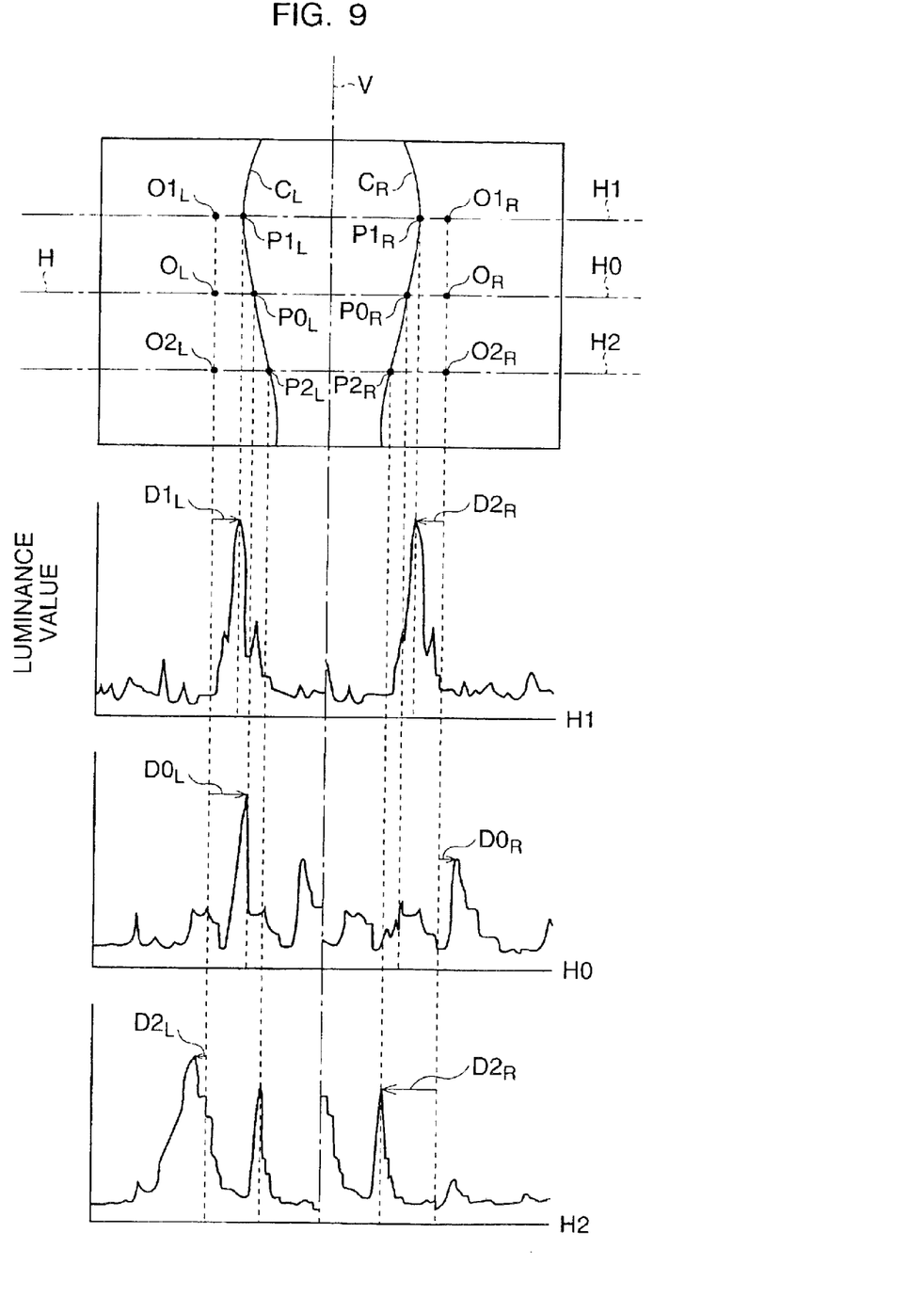
FIG. 9 illustrates image loci of a fiducial light beam on the imaging surface before the convergence adjusting operation of the second embodiment and its luminance distributions along the horizontal lines Hn at that time.

In FIG. 9, the distribution of the luminance values obtained along each horizontal line H0, H1, and H2 is illustrated as an example. On the horizontal line H1, the luminance peaks detected on the left and right-half areas (or right and left parallax image) of the imaging surface 28S coincides with the intersection points $P1_L$ and $P1_R$ of the horizontal line H1 and the line $C_L$ and $C_R$, respectively.

However, on the horizontal line H0, only the luminance peak in the left-half area coincides with the intersection point $P0_L$ of the horizontal line H0 and the curve $C_L$, and a luminance peak in the right-half area does not coincide with the intersection point $P0_R$ of the horizontal line H0 and the curve $C_R$. Further, on the horizontal line H2, only the luminance peak in the right-half area coincides with the intersection point $P2_R$ of the horizontal line H2 and the curve $C_R$, and the luminance peak in the left-half area does not coincide with the intersection point of the horizontal line H2 and the curve $C_L$.

For example, the luminance distribution on the horizontal line H, which is shown in FIG. 9, occurs when the object point P0 (corresponding to the intersections $P0_L$ and $P0_R$) on the subject is viewed from the left viewpoint while it cannot be viewed from the right viewpoint because of an obstruction, the three-dimensional shape of the subject, and so on. Further, the luminance distribution on the horizontal line H2 occurs when specula reflection at a point other than the object point P2 (corresponding to intersections $P2_L$ and $P2_R$) on the subject is stronger than the reflection at the object point P2 due to a fiducial light beam.

Similar to the first embodiment, whether the luminance peaks detected on the horizontal lines H0, H1, and H2 in the right and left-half areas (referred to as Hn (n=0,1,2) in the following) are on the curves $C_L$ and $C_R$, is determined by the relative coordinate values of the luminance peaks from the centers $O_L$, $O_R$, $O1_L$, $O_1R$, $O2_L$, and $O2_R$ on the horizontal lines Hn, respectively. Namely, on the horizontal line H1, it is determined whether the absolute value of the difference between the relative coordinate value $D1_L$ of the luminance peak in the left-half area from the center $O1_L$ and the relative coordinate value $D1_R$ of the luminance peak in the right-half area from the center $O1_R$ is smaller than δ. Similarly, on the horizontal line H, it is determined whether the absolute value of the difference between the relative coordinate value $D0_L$ of the luminance peak in the left-half area from the center $O_L$ and the relative coordinate value $D0_R$ of the luminance peak in the right-half area from the center $O_R$ is smaller than δ. Further, on the horizontal line H2, it is determined whether the absolute value of the difference between the relative coordinate value $D2_L$ of the luminance peak in the left-half area from the center $O2_L$ and the relative coordinate value $D2_R$ of the luminance peak in the right-half area from the center $O2_R$ is smaller than δ.

Figure 10:
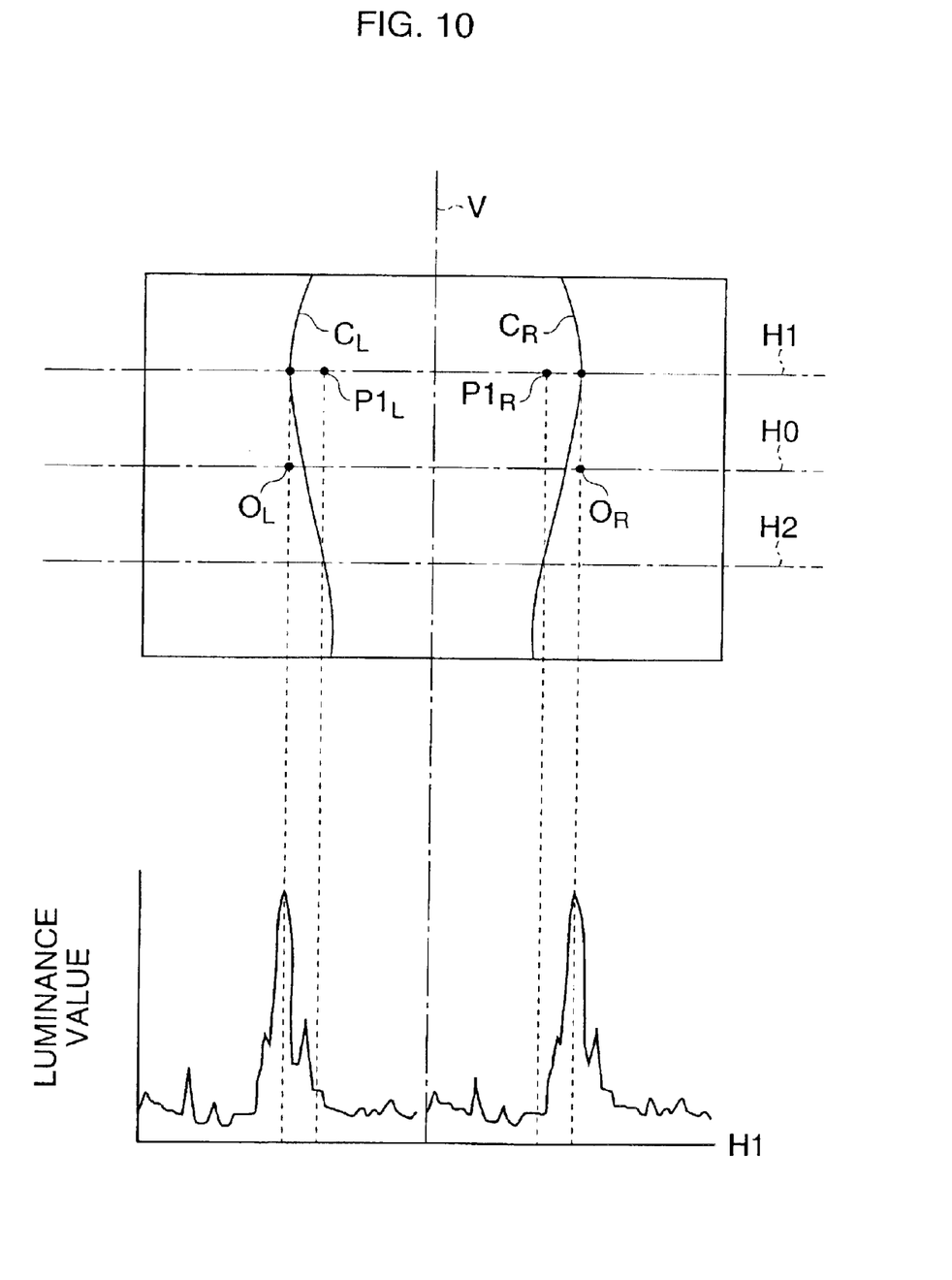
FIG. 10 illustrates image loci of a fiducial light beam on the imaging surface after the convergence adjusting operation of the second embodiment and the luminance distributions along the horizontal lines Hn at that time.

In the example shown in FIG. 9, the luminance peaks in both the right and left-half areas are considered as the intersections $P1_L$ and $P1_R$ on the curves $C_L$ and $C_R$. Therefore, the rotatable mirrors 57L and 57R are rotated so that the respective intersections $P1_L$ and $P1_R$ coincide with the centers $O1_L$ and $O1_R$. An example of the intersections $P1_L$ and $P1_R$ being respectively matched to the centers $O1_L$ and $O1_R$ is shown in FIG. 10.

Figure 11:
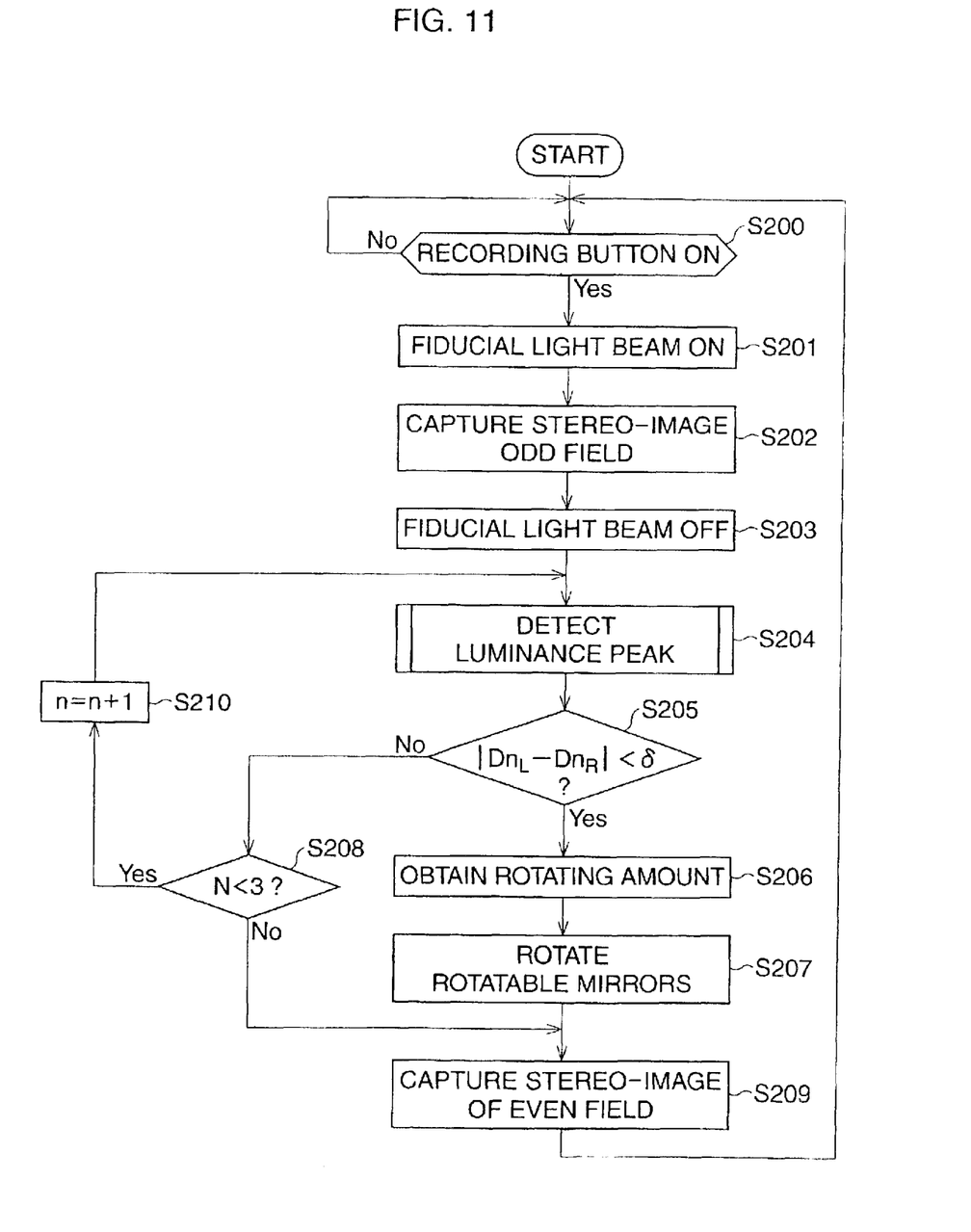
FIG. 11 is a flow chart showing the convergence adjusting operation of the second embodiment.

FIG. 11 shows a flowchart of the stereo-image capturing operations in the second embodiment, which include an automatic convergence adjusting operation. With reference to FIG. 11, the automatic convergence adjusting operation of the present embodiment will be explained. Note that, in the stereo-image capturing operation of the present embodiment, a moving or motion stereo-image will be captured.

When it is determined in Step S200 that the release switch (or recoding button) 15 is fully depressed, the Step S201 is executed so that the light-emitting device 52B is turned on and a fiducial light beam diverged in a plane is projected onto a subject from the light-emitting equipment 52'. In Step S202, right and left parallax images for an odd field are simultaneously captured in the condition that the fiducial light beam is projected onto the subject. The image data of the right and left parallax images are temporarily stored in the image memory 34. When the stereo-image capturing operation for the odd fields is completed, the light-emitting device 52B is turned off in Step S203 and a parameter "n" for the index of a horizontal line Hn is reset to "0".

In Step S204, the luminance of the odd field image data for the right and left parallax images, which are stored in the image memory 34, are examined for the horizontal line Hn in accordance with the parameter n. Namely, when n=0, the luminance values on the horizontal line H0 are examined. Further, when n=1, the luminance values on the horizontal line H1 are examined, and when n=2, the luminance values on the horizontal line H2 are examined. The luminance peaks detected in the left-half area are represented by the relative coordinate values $D0_L$, $D1_L$, and $D2_L$ (referred to as $Dn_L$ (n=0,1,2) in the following), as explained in reference to FIG. 9. Similarly, the luminance peaks in the right-half area are represented by the relative coordinate values $D0_R$, $D1_R$, and $D2_R$ (referred to as $Dn_R$ (n=0,1,2) in the following). Note that, as is similar to the first embodiment, the relative coordinate values $Dn_L$ and $Dn_R$ are described by negative values when the positions of the luminance peaks are in the areas between the centers $O_L$, $O_R$, $O1_L$, $O1_R$, $O2_L$ and $O2_R$, and by positive values when they are outside of the above areas. In the following explanation, the respective object points P0, P1, and P2 and their corresponding image loci $P0_L$, $P0_E$, $P1_L$, $P1_R$, $P2_L$, and $P2_R$ will be referred to as the points Pn, $Pn_L$, and $Pn_R$ (n=0,1,2).

In Step S205, the relative coordinates values $Dn_L$ and $Dn_R$ are compared. Namely, a subtraction is carried out between the relative coordinates values $Dn_L$ and $Dn_R$, and the absolute values of the results are compared with a predetermined value δ (>0) to determine whether the values are smaller than δ. The value δ is set as a small value that is sufficient to regard the relative coordinate values $Dn_L$ and $Dn_R$ as being substantially the same when the absolute value of the difference between relative coordinate values $Dn_L$ and $Dn_R$ is smaller than the value δ.

When $|Dn_L-Dn_R|<δ$, the positions of the luminance peaks on the horizontal line Hn of the right and left parallax images, which are detected in Step S204, are symmetric to each other with respect to the vertical line V. Thereby the peaks can be regarded as indicating the image loci $Pn_L$ and $Pn_R$ of the point Pn in the right and left parallax images. Therefore, when it is determined $|Dn_L-Dn_R|<δ$ in Step S205, the process proceeds to Step S206, in which the rotating amounts of each rotatable mirror 57L and 57R are obtained in accordance with the values of the detected coordinates $Dn_L$ and $Dn_R$ and the current angles of the rotatable mirrors 57L and 57R.

In Step S207, the convergence is adjusted to the point Pn by rotating the rotatable mirrors 57L and 57R. In Step S208, right and left parallax images of an even field are simultaneously captured without a fiducial light beam, and the image-data is stored in the image memory 34. Then the process returns to Step S200 and the same steps are repeated until the recording button is released. Note that, the right and left parallax images of the even field, which are stored in the image memory 34, may be recorded in a recording medium M, such as an IC card, later on.

On the other hand, when it is determined in Step S205 that $|Dn_L-Dn_R|<δ$ is not true, at least one of the detected luminance peak positions cannot be considered as the image locus $Pn_L$ or $Pn_R$ of the point Pn. Then the process proceeds to Step S208, in which it is determined whether the current parameter n is under "3". When n<3, the number of the parameter n is incremented and altered by n+1. Then the process returns to Step S204 and luminance peaks on the horizontal line corresponding to the parameter n+1 are searched. Accordingly, the luminance peaks on the horizontal line Hn (n=0,1,2) are examined in order.

When n<3 is not true, i.e. when n=3, the process proceeds to Step S209, so that a stereo-image of an even field is captured without replacing the angles of the rotatable mirrors 57L and 57R, and then the process returns to Step S200 after the completion of the stereo-image capturing of the even field.

Note that, the operations in Step S204 through Step S208 are executed during a vertical blanking interval.

As described above, according to the second embodiment, similar effects to those in the first embodiment can be achieved. Further, in the second embodiment, a fiducial light beam is divergently emitted in the plane of symmetry for the stereo-image and the luminance peaks can be searched for on a plurality of horizontal lines, so that even when a fiducial point is undetectable on one horizontal line, it can be compensated by the other fiducial points on the other horizontal lines. Therefore, automatic convergence control or adjustment is carried out confidently, easily, and swiftly when compared with the first embodiment. Further, in the second embodiment, the convergence is adjusted with reference to only odd field images while even field images are captured as a moving stereo-image, thus a natural moving stereo-image can be obtained easily.

Note that, in the present embodiments, although mirrors are used as an optical device for the stereo adapter, a prism may be used as an alternative. Further, in the present embodiments, a pair of parallax images or stereo-image is captured by one imaging device by bisecting its imaging area into two areas, however, two distinct imaging devices may be used. When using two imaging devices, an optical system may be arranged for each of the devices.

In the present embodiment, although the stereo-image capturing system is comprised of a digital camera and a stereo adapter (which is mounted onto the lens barrel), these two elements may be integrally formed.

In the second embodiment, a diffraction grating is used to diverge a fiducial light beam in a plane; a prism or other optical devices may be used as an alternative.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2001-314931 (filed on Oct. 12, 2001) which is expressly incorporated herein, by reference, in its entirety.

What is claimed is:

1. A stereo camera, comprising;
   an imaging device that captures a stereo-image which comprises a pair of right and left parallax images;
   a fiducial light beam projector that projects a light beam to a subject to produce a fiducial mark on said subject;
   a fiducial mark detecting processor that detects an image loci of said fiducial mark in said right and left parallax images; and
   a convergence adjusting processor that adjusts a convergence of said stereo-image in accordance with said image loci of said fiducial mark, wherein said fiducial light beam is emitted only in a plane of symmetry which includes a perpendicular bisector line of a segment between viewpoints of said right and left parallax images.

2. A device according to claim 1, wherein said stereo camera comprises only a single photographing optical system.

3. A device according to claim 2, wherein said right and left parallax images are simultaneously captured in a right-half area of said imaging device and a left-half area of said imaging device.

4. A device according to claim 2, wherein said plane of symmetry includes the optical axis of said photographing optical system.

5. A device according to claim 4, wherein said optical axis and view axis of said right and left parallax images are in the same plane, and said fiducial light beam is a narrow parallel beam that coincides with said optical axis.

6. A device according to claim 5, wherein said fiducial mark detecting processor detects said image loci in accordance with peak positions of luminance values on a horizontal line that passes through the centers of said right and left parallax image.

7. A device according to claim 1, wherein said fiducial light beam is flatly diverged in said plane of symmetry.

8. A device according to claim 7, wherein said fiducial mark detecting processor examines luminance values along a plurality of horizontal lines in said right and left parallax image, so that said image loci are detected in accordance with peak positions of luminance values in each of said right and left parallax images on one of said plurality of horizontal lines.

9. A device according to claim 1, wherein said fiducial mark detecting processor determines whether peak positions of luminance values correspond to said image loci of said fiducial mark in accordance with whether a peak position of luminance values in said right parallax image and a peak position of luminance values in said left parallax image have a mirror image relationship with respect to the centers of said right and left parallax image.

10. A device according to claim 1, wherein said convergence adjusting processor adjusts said convergence by adjusting said image locus of said fiducial light beam in said right parallax image to coincide with the center of said right parallax image, and by adjusting said image locus of said fiducial light beam in said left parallax image to coincide with the center of said left parallax image.

11. A device according to claim 1, wherein said convergence is controlled by a pair of rotatable mirrors that are arranged symmetrically with respect to said plane of symmetry and face one another.

12. A device according to claim 1, further comprising:
a first stereo-image capturing processor that captures a first stereo-image with said fiducial light beam; and
a second stereo-image capturing processor that captures a second stereo-image without said fiducial light beam,
wherein said fiducial mark detecting processor detects said image loci of said fiducial mark in accordance with said first and second stereo-images.

13. A device according to claim 12, wherein said fiducial mark detecting processor detects said image loci according to a difference between luminance values of said first and second stereo-images.

14. A device according to claim 1, wherein said fiducial light beam projector is turned on while capturing said stereo-image in a first field, and said fiducial light beam projector is turned off while capturing said stereo-image in a second field, so that said convergence of said stereo-image in said second field without said fiducial mark is adjusted with reference to said stereo-image in said first field with said fiducial mark, thereby a moving stereo-image of said subject is obtained.

15. An automatic convergence adjusting device utilized for adjusting a convergence of a stereo-camera, comprising:
a fiducial light beam projector that projects a light beam to a subject to produce a fiducial mark on said subject;
a fiducial mark detecting processor that detects an image loci of said fiducial mark in said right and left parallax images of a stereo-image; and
a convergence adjusting processor that adjusts a convergence of said stereo-image in accordance with said image loci of said fiducial mark,
wherein said fiducial light beam is emitted only in a plane of symmetry which includes a perpendicular bisector line of a segment between viewpoints of said right and left parallax images.

16. A stereo camera which comprises a digital camera and a stereo adapter that is mounted on a lens barrel of said digital camera;
wherein said stereo adapter comprises:
a fiducial light beam projector that projects a light beam only in a plane of symmetry which includes a perpendicular bisector line of a segment between viewpoints of each of said right and left parallax images of a stereo-image;
a convergence adjusting processor that adjusts a convergence of said stereo-image; and
said digital camera comprises:
a stereo-image capturing processor that captures said right and left parallax images with said fiducial mark produced on said subject,
wherein said convergence adjusting processor adjusts said convergence in accordance with an image loci of said fiducial mark in each of said right and left parallax images.

* * * * *